United States Patent

[11] 3,571,635

| [72] | Inventor | Russell J. Turner<br>Schenectady, N.Y. |
| [21] | Appl. No. | 813,964 |
| [22] | Filed | Apr. 7, 1969 |
| [45] | Patented | Mar. 23, 1971 |
| [73] | Assignee | General Electric Company |

[54] TURBINE-GENERATOR STATOR FRAMES
2 Claims, 4 Drawing Figs.

[52] U.S. Cl............................................... 310/59,
310/258
[51] Int. Cl............................................... H02k 9/08
[50] Field of Search........................................ 310/54, 57,
58, 59, 60, 258, 64, 65, 254, 55

[56] References Cited
UNITED STATES PATENTS

| 3,091,710 | 5/1963 | Shartrand et al. | 310/55X |
| 3,348,081 | 10/1967 | Willyoung | 310/55 |
| 3,428,838 | 2/1969 | Carson et al. | 310/57X |
| 3,441,758 | 4/1969 | Albright et al. | 310/64X |

Primary Examiner—D. F. Duggan
Attorneys—William C. Crutcher, Frank L. Neuhauser and Oscar B. Waddell ABSTRACT: A dynamoelectric machine frame in which end sections of greater diameter are telescoped over the central section wrapper plate and sealed thereto to form a gastight frame. The gas-cooling system ducting is disposed internally in both the central section and end sections.

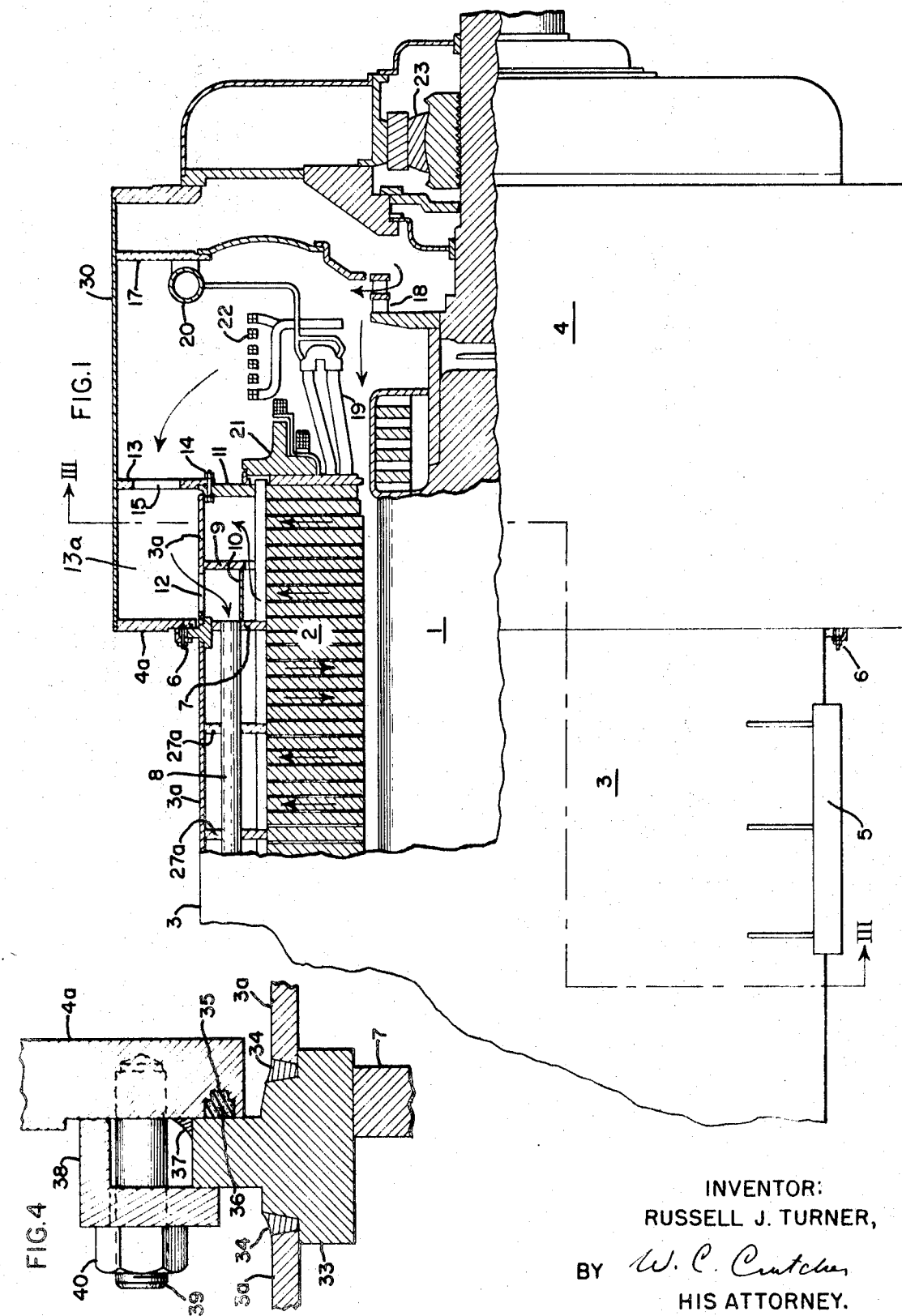

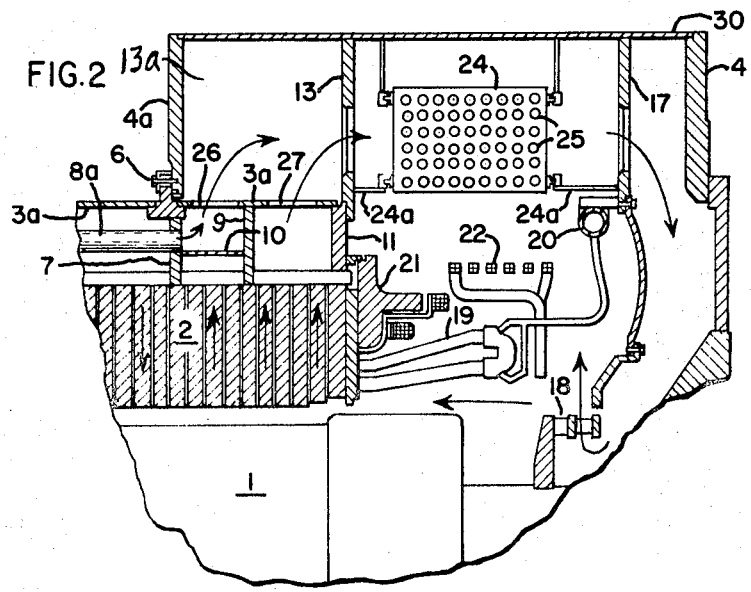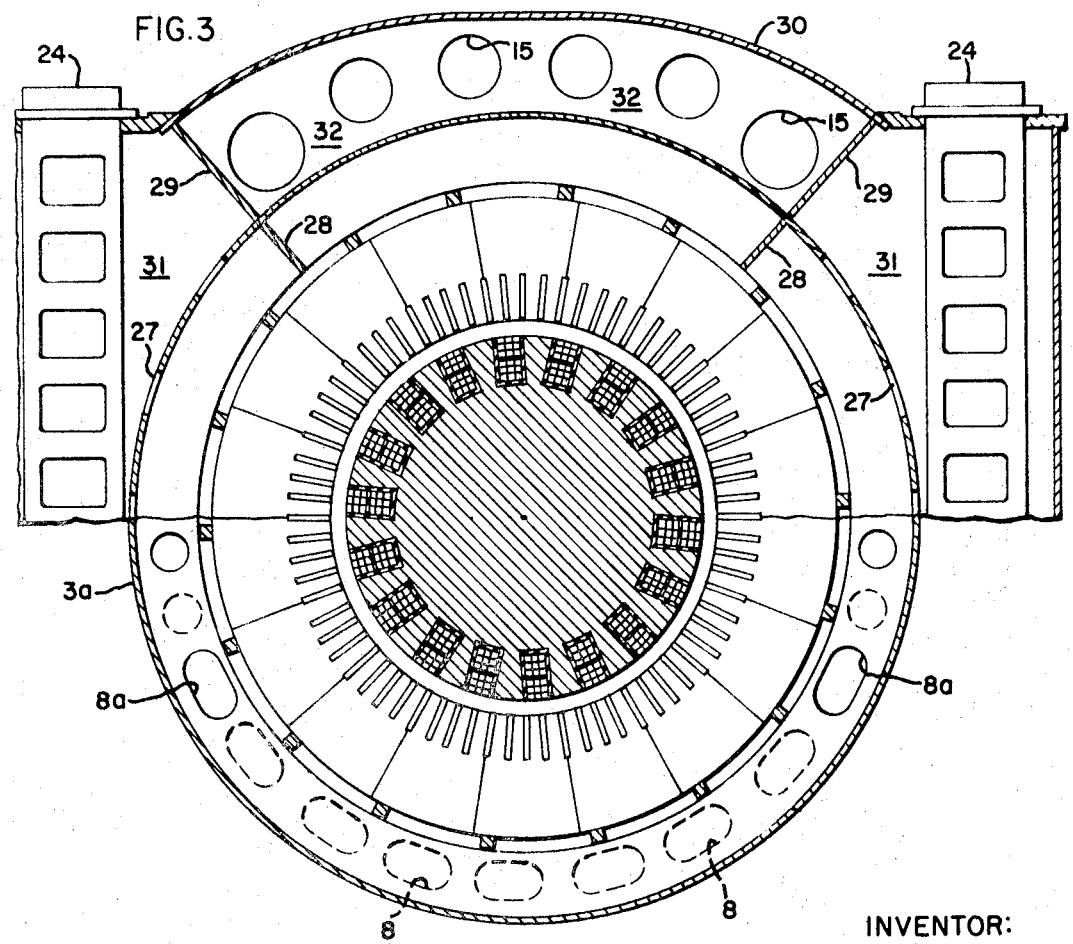

TURBINE-GENERATOR STATOR FRAMES

BACKGROUND OF THE INVENTION

The present invention is directed to stator frames of large dynamoelectric machines. More particularly, it relates to an outer stator frame that is built in sections. In dynamoelectric machines of large ratings, it becomes a problem to transport them as the physical dimensions become larger and larger with the increases in rating demanded by increased electrical usage. One method of solving the problem while allowing the frame size and rating to increase and still be carried on a railroad flat car to its installation point, is to ship the stator frame in sections and then assemble the complete frame in the field.

In prior art sectioned stator frames, the number and complexity of design of major parts for assembly was not conducive to simple field assembly. Accordingly, some objects of the present invention are to have a sectioned stator frame that has the least number of major parts for field assembly, requires the least amount of welding in field assembly, and requires no major auxiliary assembling devices.

Another problem associated with sectioned stator frames was in the cooling system. Usually, external ventilating tubes were necessary. Accordingly, it is a further object of the present invention to have the complete cooling system contained within the sections.

SUMMARY OF THE INVENTION

The present invention is practiced in one form by providing separate end sections or frames which are slidably positioned over the longer cylindrical section wrapper plate of a large dynamoelectric machine. The end sections contain part of the cooling system ducting including the coolers which, when the end sections are assembled, completes the cooling system ducting arrangement. A simple circumferential seal weld in conjunction with a bolting together of parts in the field joins the end frames to the central frame wrapper plate and provides a gas tight joint.

DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is a cutaway elevation view in section of part of a dynamoelectric machine showing an end frame in assembled position.

FIG. 2 is a cutaway plan view in section also showing an end frame in assembled position.

FIG. 3 is a cross section taken along line III-III of FIG. 1 looking in an axial direction and showing the internal ducting.

FIG. 4 is an enlarged view in section of the circumferential joint between the central frame wrapper plate and end frames.

DESCRIPTION OF THE PREFERRED EMBODIMENT

Referring now to FIG. 1 of the drawing, a portion of a large dynamoelectric machine such as a hydrogen-cooled generator found in conjunction with a steam turbine-generator set, has a rotor 1 disposed so as to rotate within the cylindrical bore of a laminated core structure 2. The core 2 is coaxially supported within the usual central section plates and central or middle stator frame 3. Comprising the covering for frame 3 is central frame wrapper plates 3a. Telescoped over the end and extending in an axial direction over a part of central frame 3 is annular end frame 4. End frame 4 is of greater diameter and circumference compared to central frame 3, and is comprised of two portions. The first portion is that which extends axially over the central frame wrapper plate 39 while the second portion extends axially outward from the end of central frame 3. Spaced along the axial length of central frame 3 are generator supports 5. Supports 5 provide a base for the generator during factory assembly.

Referring further to FIG. 1 and in particular to the cutaway portion, the general construction of the assembled generator is shown with annular end frame 4 telescoped or slidably positioned over central frame 3 and joined thereto at circumferential joint 6. A portion of the cooling system, which is of the usual gaseous coolant type in large dynamoelectric machines, is shown including part of the ducting in central frame 3. For the most part, the ducting and gas flow in central frame 3 is of a conventional design and known to the art. However, the axial length of frame 3 over which the first portion of end frame 4 extends is adapted so at to accommodate and communicate with that part of the cooling system ducting or conduit means in end frame 4. A radially extending section plate or baffle 7 is disposed between core 2 and central frame wrapper plate 3a at the axial point along the central frame where joint 6 is located. Interior baffles (section plates) 27a are of the same general description as baffle 7 and provide both ducting passages and support means for the frame 3 and core 2. Top and bottom ducting pipes or conduits 8 for the cool gas are positioned in baffle 7 about a portion of its circumference. A second circumferential baffle (section plate) 9 is positioned axially outboard of baffle 7 in order to separate the cool gas ducting from the hot gas ducting. An axially extending circumferential ring or baffle 10 is disposed between baffle 7 and baffle 9 so as to further direct the coolant flow into the proper ducting. At the outboard end of central frame 3, there is located outer circumferential baffle 11 (section plate) which also serves to direct the coolant flow and provide support. Toward the outboard ends or end region, that is the area between baffles 7 and 11, of central frame 3 and located in central frame wrapper 3a are circumferentially spaced coolant inlet holes 12 extending around a portion of the circumference of frame 3.

Turning now to a description of the internal configuration of annular end frame 4, FIG. 1 shows the elevation view in the inlet gas flow area. As previously mentioned, end frame 4 has a greater circumference than central frame 3 in order to accommodate a part of the generator's cooling system. A radially extending section plate or baffle 13 is positioned so as to extend radially from the end of central frame 3 to the inside diameter of end frame 4. This is generally the division between the first portion of end frame 4 having an annular chamber 13a and the second portion of end frame 4. Means to join baffle 13 to central 3 are provided at 14. Extending around a part of baffle 13 are cool gas inlet holes 15. The usual configuration is followed in the remaining design of the generator end frames in that baffle 17 is positioned so as to separate and direct the cooled gas to fan 18 located on the end of rotor 1. Stator winding bar 19, circular liquid coolant header 20, circular flange ring 21, phase connections 22, and bearing and pedestal 23 are all positioned in a manner known to the art. The directional arrows in FIG. 1 show the flow path of the cool or inlet gas as it emerges from fan 18, proceeding to the gap between rotor 1 and core 2, and as it flows radially outwardly over phase connectors 22, through holes 15 into annular chamber 13a, radially inward through holes 12 and on into central frame 3 via conduits 8. Between selected section plates the cool gas exits from conduits 8 and flows radially inward through core 2.

Referring now to FIG. 2 wherein a plan view of the end frame is shown, the same general configuration is shown but with a different flow path to indicate that the general path taken by the hot or outlet gases returning from the core 2 to flow the vertical tube coolers 24 is between selected section plates into the conduits 8a and thence along the sides of the dynamoelectric machine to the annular chamber 13a and axially through coolers 24. Coolers 24 are located within the second portion of end frame 4 such that the hot returning gases are directed to pass over vertical heat exchanger tubes 25 within coolers 24. Cooler baffles 24a extend between baffles 13 and 17 and in conjunction with the side of cooler 24 serve to direct the flow of the hot returning outlet gases.

Disposed in the same manner as are the cool gas inlet holes 12, i.e., around a part of the circumference or wrapper plate 3a on central frame 3 but about the side portions thereof, are hot gas outlet holes 26, 27. It will be appreciated that the side ducting pipes 8a for the hot gases and top and bottom ducting pipes 8 for cool gases are separated by baffles 28 as shown in the upper portion of FIG. 3. Baffles 28 extend axially along central frame 3 between core 2 and wrapper plate 3a from the end to end of frame 3 to the section plate 7 at four points about the circumference of the central frame. Baffles 28 confine the hot and cool gases which have not yet entered or exhausted from conduits 8 and 8a to their proper flow paths within the portion of frame 3 directly below the first portion of end frame 4. Baffles 29 extend axially along end frame 4 from the end at joint 6 and between central frame wrapper plate 3a and end frame wrapper plate 30, and from cooler baffles 24a and the cooler side to the end frame wrapper plate 30 so as to divide the internal configuration of end frame 4 into hot ducting areas 31 and cool ducting areas 32. Collectively the inlet gas flow area is defined by the upper and lower portions of the wrapper plates 3a and 30, the baffles 28 and 29, the conduits 8, and circumferential areas between selected section plates. Likewise, the outlet gas flow area is defined by the side portions of the wrapper plates 3a and 30, baffles 28 and 29, the conduits 9a, and circumferential areas between selected section plates. The fan 18 is between the inlet flow area and outlet flow area and the coolers are mounted wholly within the outlet gas flow area.

Referring now to FIG. 4, an enlarged view of joint 6 is shown which is the primary joining point between frame 3 and end frame 4. Joint 6 is comprised of a circumferential tee section 33 which is disposed in wrapper plate 3a and tightly joined thereto in order to form a gastight construction. One method of joining is that of welding with seam welds indicated at 34. In the radially extending portion 4a of end frame 4 is circumferential groove 35 which may take various cross-sectional forms but is here shown as a tee section. In the field, on assembly, sealing means 36 is disposed in groove 35 and a continuous circumferential seam weld is made at 37 in order to insure a gastight structure. Segmental clamping means 38 with bolts 39 and nuts 40 are disposed at points about the circumference to further strengthen the joint between central frame 3 and end frame 4.

OPERATION

The operation of the present invention will now be described. Shipment from the manufacturing plant is accomplished by transporting central frame 3 together with core 2 separate from end frames 4. Consequently a railroad flatcar can, with the present physical size of large generators, be provided to ship the central frame. Upon arrival at the installation point, construction of the complete generator is accomplished by sliding the end frame over the end of the central frame in a manner so that the cooling system in both frames is properly arranged with one another. A single circumferential seam weld is made at 37 and any additional joining means are provided externally to the wrapper plates as necessary. The operation of the cooling system has been described under the structural description and will not be further described.

It will thus be appreciated that a dynamoelectric machine frame has herein been described which is a substantial improvement over those of the prior art. There are a minimum number of major parts for field assembly since only the end frame is joined to the central frame.

The assembly of the end frame is accomplished with a minimum amount of welding in the field. A still further advantage is that there are no external cooling ducts.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

I claim:

1. A dynamoelectric machine of the type having a plurality of circumferential section plates surrounded at their periphery by a generally cylindrical wrapper plate with said section plates and said wrapper plate cooperating to form a portion of the cooling system for the cooling gas, with the improvement comprising:
fan means positioned between said inlet gas flow area and said outlet flow area so as to motivate the cooling gas through said cooling system.

2. A dynamoelectric machine according to claim 1 further including circumferential sealing means positioned at the circumferential joint between said wrapper plate and said first portion of the annular end section arranged to provide a gastight machine after said annular end section has been slidably positioned to its operative configuration.

UNITED STATES PATENT OFFICE
CERTIFICATE OF CORRECTION

Patent No. 3,571,635            Dated March 23, 1971

Inventor(s)      Russell J. Turner

It is certified that error appears in the above-identified pater and that said Letters Patent are hereby corrected as shown below:

Column 4, after line 38, insert -- an annular end section of first and second portions having a greater circumference than said wrapper plate, slidably positioned over the end of said wrapper plate and axially spaced from end of said wrapper plate such that the wrapper plate together with the first portion of said annular end section defines an annular chamber extending about the full circumference of said wrapper plate, said annular chamber having openings therein for the radial flow of gas between said wrapper plate and said annular chamber, a plurality of axially extending baffle plates positioned along and within the end region of said wrapper plate and said annular chamber, arranged and adapte divide said annular chamber and end region of said wrapper plate circumferentially so as to form portions of inlet and outlet gas flow areas, a pair of gas coolers positioned vertically and on eith side of said second portion of the annular end section with said outlet gas flow area, a plurality of first conduit means positioned within sa inlet gas flow area and extending through selected section plates arranged and adapted to collect and distribute the cooled gas after it flows through said coolers, a plurality of second conduit means positioned within s outlet gas flow area and extending through selected section plates arranged and adapted to collect the hot gas and dire it so as to flow through said coolers, and Signed and sealed this 7th day of December 1971.

(SEAL)
Attest:

EDWARD M. FLETCHER, JR.            ROBERT GOTTSCHALK
Attesting Officer                   Acting Commissioner of